United States Patent [19]

Campbell

[11] 4,294,659
[45] Oct. 13, 1981

[54] APPARATUS FOR USE IN A LIQUID ALKALI METAL ENVIRONMENT

[75] Inventor: Charles S. Campbell, Hale, England

[73] Assignee: United Kingdom Atomic Energy Authority, London, England

[21] Appl. No.: 869,443

[22] Filed: Jan. 16, 1978

[30] Foreign Application Priority Data

Feb. 4, 1977 [GB] United Kingdom ............... 11924/77

[51] Int. Cl.³ ............................................ G21C 19/28
[52] U.S. Cl. .................................... 165/133; 376/405
[58] Field of Search ................ 428/652, 679; 165/133, 165/180, DIG. 8; 176/40, 50, 87

[56] References Cited

U.S. PATENT DOCUMENTS

| | | | |
|---|---|---|---|
| 3,129,069 | 4/1964 | Hanink et al. ....................... | 428/652 |
| 3,229,759 | 1/1966 | Grover .......................... | 165/DIG. 8 |
| 3,628,923 | 12/1971 | White .................................. | 165/180 |
| 3,726,339 | 4/1973 | Ash ................................... | 176/65 X |
| 3,819,338 | 6/1974 | Bungardt et al. ................... | 428/652 |
| 3,989,096 | 11/1976 | Allardyce et al. ............ | 165/DIG. 8 |
| 4,023,936 | 5/1977 | Morse et al. ....................... | 428/679 |
| 4,082,575 | 4/1978 | Eastman .......................... | 165/133 X |
| 4,087,589 | 5/1978 | Bessen ............................ | 428/652 X |
| 4,103,076 | 7/1978 | Ulam .............................. | 428/652 X |
| 4,134,451 | 1/1979 | Conant ......................... | 165/DIG. 8 |

*Primary Examiner*—Peter A. Nelson
*Attorney, Agent, or Firm*—Larson and Taylor

[57] ABSTRACT

Heat exchange apparatus for use in a liquid metal environment comprising heat exchange tubes and grid plates having complementary bearing surfaces. The tubes are of stainless steel and the complementary bearing surfaces of the grids are aluminized to reduce wear and friction.

3 Claims, 3 Drawing Figures apparatus for use in a liquid alkali metal environment

BACKGROUND OF THE INVENTION

This invention relates to apparatus for use in a liquid alkali metal environment.

The use of liquid alkali metals such as sodium in industry is now quite common. For example, in the nuclear reactor industry liquid sodium is used as a vehicle to convey heat energy from a nuclear reactor core to heat exchange apparatus wherein steam is generated and superheated. Because of the hostile nature of the material particularly when operating in the temperature range of 500°–600° C., wear, fretting and high coefficients of friction between bearing surfaces present a serious problem. Heat exchangers for use with sodium are particularly susceptible to this problem. In one known sodium/water heat exchanger a 9% Cr 1% Mo stainless steel has been selected for the heat exchange tubes because this material offers high resistance to stress corrosion cracking, pitting corrosion and to decarburisation but where the tubes make bearing contact with complementary bearing surfaces giving lateral support to the tubes there is a tendency for transfer of the alloy steel to the complementary bearing surface. Several materials have been used or suggested for the complementary bearing surfaces, for example stabilised 2¼ Cr 1 Mo stainless steel, nickel base alloys such as Inconel 718 (Inconel is a registered trade mark), stellite and chromium carbide but none of these bearing surface materials are satisfactory when used with stainless steel tubes.

SUMMARY OF THE INVENTION

According to the invention in apparatus for use in a liquid alkali metal environment comprising components having complementary bearing or rubbing surfaces, one of the components has a bearing surface of stainless steel and another of the components has an aluminised complementary bearing surface.

It has been found by experiment that when a stainless steel bearing surface is used with an aluminised complementary bearing surface in a liquid sodium environment there is little wear of the surfaces, the wear tracks remain relatively smooth and the coefficient of friction is low when compared with the wear, smoothness and friction characteristics associated with conventional bearing surfaces.

It is believed that the exceptionally good behaviour of these materials is brought about by the relatively easy formation of sodium aluminate by reaction with the oxygen containing sodium; the sodium aluminate serves as a lubricant.

In a preferred apparatus according to the invention the complementary bearing surface comprises an aluminised nickel base alloy.

The invention resides in apparatus for use in heat exchange and comprising a tube-in-shell heat exchanger for effecting heat exchange between liquid sodium flowing through the shell and water flowing through the tubes, the tubes being laterally supported intermediate their ends by relatively slidable bearing surfaces and wherein the tubes are of stainless steel and the bearing surfaces are aluminised.

In a preferred tube-in-shell heat exchanger embodying the invention the bearing surfaces for the tubes are of aluminised nickel base alloy.

The invention also finds application in heat exchange apparatus in the form of a fuel sub-assembly for a liquid metal cooled fast breeder nuclear reactor and comprising a bundle of spaced fuel pins enclosed within a tubular wrapper the pins being laterally supported by a series of cellular grids in which each pin occupies a discrete cell of each grid, and wherein the fuel pins have stainless steel sheaths and the cellular grids are of nickel based alloy having aluminised bearing surfaces for the pins.

DESCRIPTION OF THE DRAWINGS

Apparatuses embodying the invention are described by way of example with reference to the accompanying drawings wherein.

DESCRIPTION OF THE PREFERRED EMBODIMENTS

Figure 1:
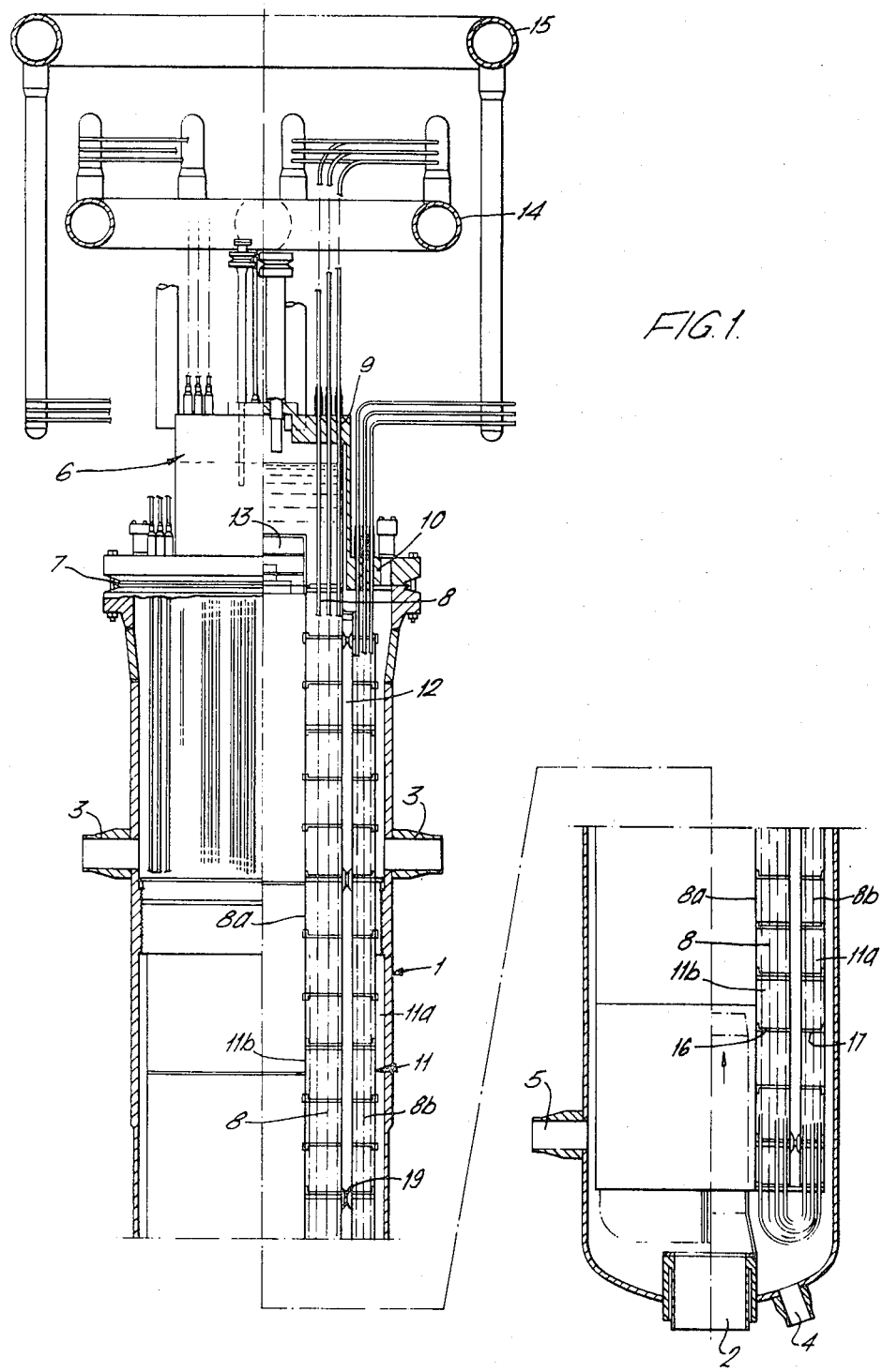
FIG. 1 is a fragmentary side view in section of a tube-in-shell heat exchanger.

The tube-in-shell heat exchanger shown in FIG. 1 of the drawings is for use in a steam generating circuit of a liquid metal cooled fast breeder nuclear reactor installation. The heat exchanger comprises a generally cylindrical shell 1 closed at the lower end and open at a flanged upper end. The shell has a sodium inlet port 2 in the base, side outlet ports 3, a drain port 4 and a pressure release connection 5 for relief of pressure in the shell in the event of the occurrence of a sodium water reaction. The open end of the shell has a flanged cylindrical extension 6 which is closed at its upper end the flanges of the shell and extension being bolted together and peripherally sealed with a light weld at 7. The heat exchange tubes designated 8 are of 'U'-shape having legs of unequal length and are suspended within the shell from the extension 6. The longer legs 8a extend along the extension to penetrate the end cover which thereby forms an inner tube sheet 9 and the shorter legs penetrate the flange of the extension which forms an annular outer tube sheet 10. The tubes are enclosed by an annular shroud 11 bounded by two co-axially arranged cylindrical members 11a, 11b, and there is a cylindrical baffle 12 carried from the inner tube sheet which extends co-axially within the shroud 11 between the long and short legs of the tubes. The sodium flow path from the inlet port at the base of the shell is upwardly through the inner cylindrical member 11b of the shroud to a distributor 13 in the extension 6 thence downwardly over the longer legs of the tubes, upwardly over the shorter legs thence to leave the shell by way of the outlet ports 3. The long and short legs of the 'U'-tubes are connected to outlet and inlet steam headers 14 and 15 respectively shown in FIG. 1. The 'U'-tubes 8 are of 9 Cr 1 Mo alloy steel.

Figure 2:
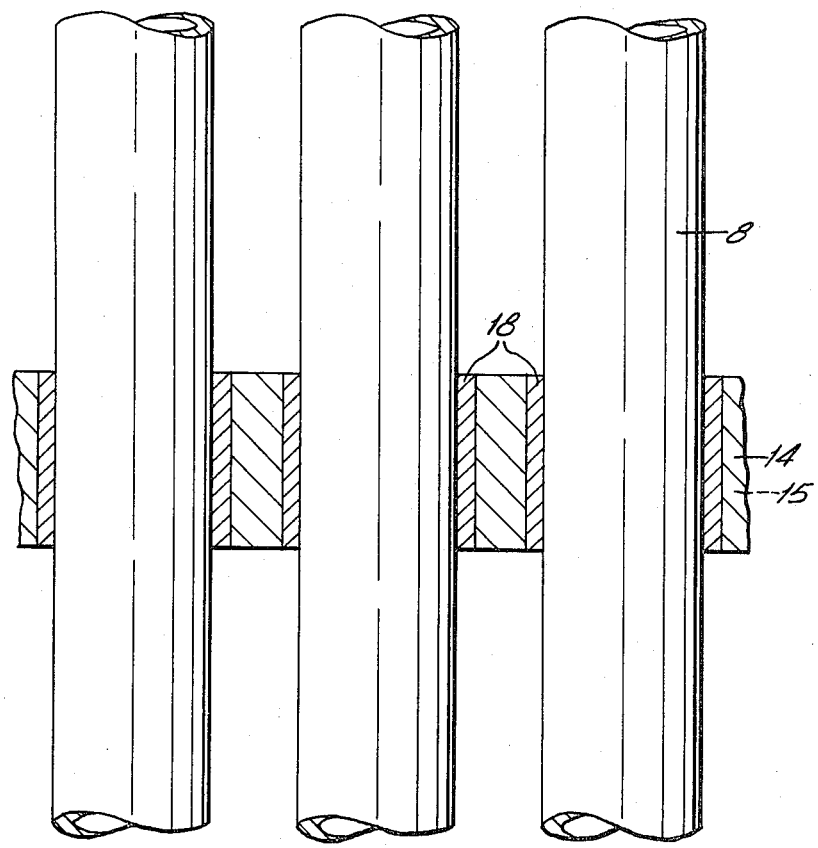
FIG. 2 is a fragmentary side view in section of heat exchange tubes with a lateral support, therefor.

The complex of tubes is laterally supported by the cylindrical baffle 12 which is suspended from the underside of the inner tube sheet 9. The baffle is double walled to reduce heat transfer therethrough and there are pads 19 disposed at intervals between the inner and outer walls to space them apart during handling operations. The pads 19 are welded to the inner wall but have sliding contact with the outer wall to accommodate differential thermal linear expansion of the walls in the axial direction. Inner and outer annular cellular grids 16, 17 of 2¼ Cr 1 Mo alloy steel are secured to the inner and outer walls of the cylindrical baffle 12 at axially spaced intervals to provide lateral support for the tubes 8. As shown in FIG. 2 each cell of the grids has a bush 18 of Inconel 718 (R.T.M.) which has an aluminised bore 19 providing a bearing surface for the tube to accommodate relative movement due to linear thermal expansion and to reduce fretting wear of the tubing as a result of flow induced vibration.

Heat exchanger tubes of 9 Cr 1 Mo have been found to operate in aluminised Inconel 718 (R.T.M.) bushes with remarkable absence of pickup, low coefficients of friction and with insignificant wear.

The aluminised bearing surface may be produced by diffusing aluminium into the surface of the material by a "pack" process analogous to pack carburising and performed in a sealed container. A low-activity pack giving a relatively thick coating based on Ni Al is preferred. The pack composition may consist of an inert support such as coarse alumina powder, pure aluminium or an aluminium containing alloy and a halide which will produce a gaseous atmosphere within a sealed container, the aluminium being transferred to the surface material by way of the gas phase.

Figure 3:
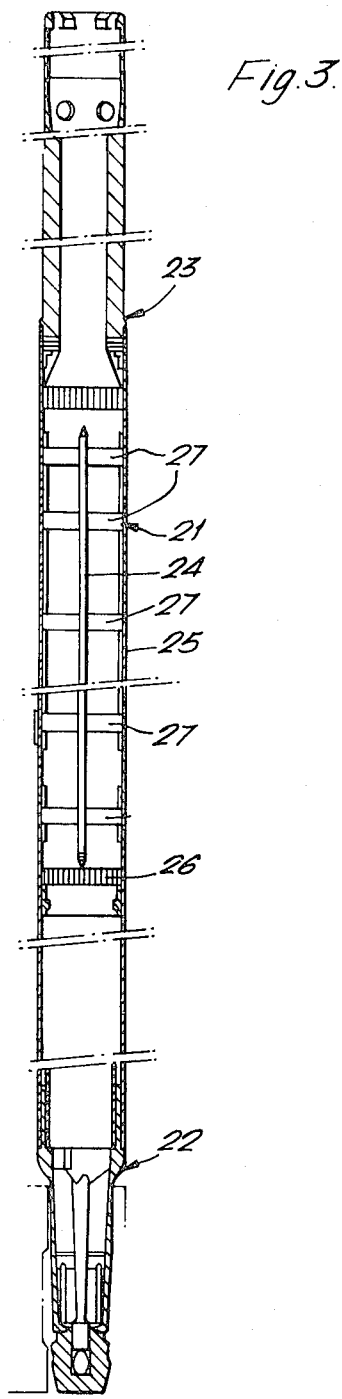
FIG. 3 is a fragmentary side view in section of a fuel sub-assembly for a liquid metal cooled fast breeder nuclear reactor.

Heat exchange apparatus in the form of a fuel sub-assembly for a liquid metal cooled fast breeder nuclear reactor is shown in FIG. 3. The fuel sub-assembly comprises a central fuel section 21, a lower end locating section 22 and an upper end neutron shielding section 23. The fuel section comprises a bundle of spaced elongate fuel pins 24 (only one being shown in FIG. 3) enclosed within a tubular shell or wrapper 25 of hexagonal cross-section. The lower and upper ends of the wrapper define inlet and outlet ports respectively for conducting liquid metal coolant therethrough in heat exchange with the fuel pins. The fuel pins 24 comprise tubes or sheaths of 316 Type stainless steel containing heat generating nuclear fuel and they are supported in the wrapper at their lower ends by a grid 26. The pins are laterally supported in the wrapper by a series of cellular grids 27 of honeycomb form each pin occupying a discrete cell in each cellular grid and being free to slide longitudinally therein to accommodate differential linear thermal expansion. The cellular grids 27 are of nickel base alloy (Inconel 718 R.T.M.) and have aluminised bores to provide bearing surfaces for the pins. In a liquid metal cooled fast breeder nuclear reactor a fuel assembly comprising a plurality of the described fuel sub-assemblies is submerged in a pool of liquid sodium coolant.

I claim:

1. Heat exchange apparatus for use in a liquid alkali metal environment comprising, a bundle of spaced heat exchange tubes of stainless steal, a tubular shell housing the tubes and adapted by inlet and outlet ports for conducting liquid alkali metal therethrough in heat exchange with the tubes, and a plurality of cellular grids laterally supporting the tubes in the shell, each tube slidably occupying a discrete cell of each grid and wherein the complementary bearing surfaces of the grids for the tubes are aluminised.

2. Heat exchange apparatus for use in a liquid alkali metal environment comprising, a bundle of spaced heat exchange tubes of stainless steel, a tubular shell housing the tubes and adapted by inlet and outlet ports for conducting liquid alkali metal therethrough in heat exchange with the tubes, and a plurality of cellular grids laterally supporting the tubes in the shell, each tube slidably occupying a discrete cell of each grid and wherein the complementary bearing surfaces of the grids for the tubes comprise aluminized nickel base alloy.

3. Heat exchange apparatus for use in a liquid alkali metal environment comprising, a bundle of spaced heat exchange tubes of stainless steel, a tubular shell housing the tubes and adapted by inlet and outlet ports for conducting liquid alkali metal therethrough in heat exchange with the tubes, and a plurality of cellular grids laterally supporting the tubes in the shell, each tube slidably occupying a discrete cell of each grid and each cell of said grids including a bush of nickel base alloy, each bush having an aluminized bore providing the complementary bearing surface for a heat exchange tube.

* * * * *